United States Patent [19]
Schulte

[11] Patent Number: 5,407,613
[45] Date of Patent: Apr. 18, 1995

[54] PROCESS AND APPARATUS FOR BENDING PLASTIC PIPE

[76] Inventor: Franz Schulte, Siemensstr. 7, 59557 Lippstadt, Germany

[21] Appl. No.: 149,206

[22] Filed: Nov. 9, 1993

[51] Int. Cl.⁶ ............................................ B29C 53/08
[52] U.S. Cl. ..................... 264/25; 264/322; 264/339; 264/345; 264/348
[58] Field of Search ............... 264/25, 322, 339, 345, 264/348, DIG. 65

[56] References Cited

U.S. PATENT DOCUMENTS

| | | | |
|---|---|---|---|
| 3,753,635 | 8/1973 | Barnett | 264/339 X |
| 4,747,768 | 5/1988 | Crupi | 425/392 |

FOREIGN PATENT DOCUMENTS

| | | | |
|---|---|---|---|
| 383307 | 6/1987 | Austria. | |
| 1479227 | 3/1969 | Germany. | |
| 4108152 | 9/1992 | Germany | 264/339 |
| 4215920 | 11/1993 | Germany | 264/339 |

Primary Examiner—Leo B. Tentoni
Attorney, Agent, or Firm—Griffin, Butler, Whisenhunt & Kurtossy

[57] ABSTRACT

A bending process including both preliminary and following steps takes place in one apparatus. A plastic pipe (6) is heated to a temperature in which it can be plastically deformed. The heated pipe is thereafter shoved into a pipe-shaped bending channel (27) of a bending tool, with the bending tool comprising two dies (9,10), each respectively defining a groove (14,13) which together form the bending channel. Finally, a cooling agent is allowed to flow through the bent pipe which is still in the bending tool. The thusly cooled pipe is removed from the bending tool after the dies are separated from one another. The apparatus to bend the plastic pipe comprises heating, bending, and cooling stations (1,2,3). The heating station comprises two heating fixtures, and the cooling station comprises a supply line (21,22) with a coupling joint (20) which can be coupled to an end of the pipe.

13 Claims, 2 Drawing Sheets

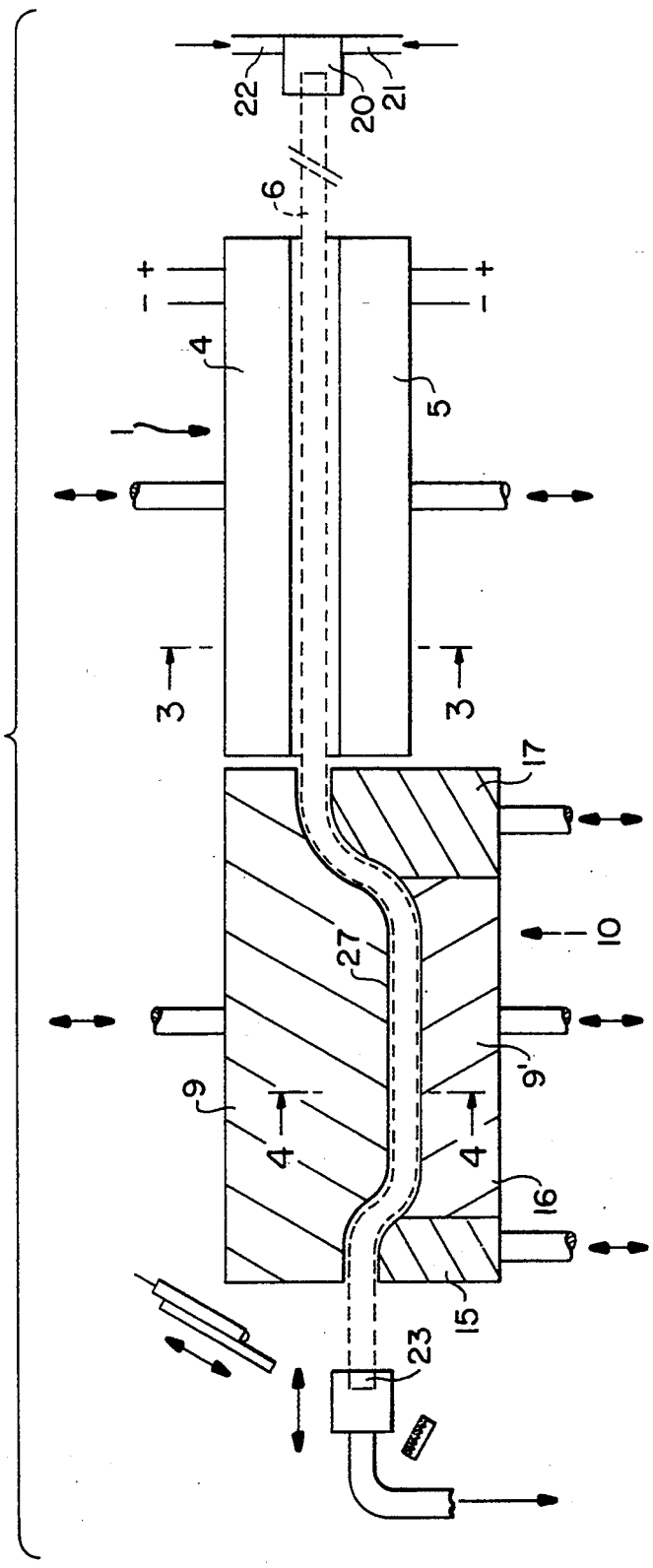
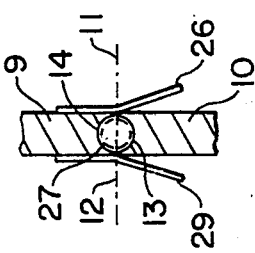
FIG. 2
FIG. 3
FIG. 4

PROCESS AND APPARATUS FOR BENDING PLASTIC PIPE

BACKGROUND OF THE INVENTION

This invention concerns processes for bending plastic pipe in which a pipe to be bent is first heated, then placed in an apparatus having a bending pattern and then cooled.

In such well-known processes plastic pipe is first given a preliminary warming in a warm liquid to bring the pipe to a temperature at which it is easier to bend; however, which does not quite place it in a plastic state. Then the pipe is laid, with the help of manual bending, in a plate-like receiving apparatus, which has a groove-shaped indentation in a shape of a desired bending pattern, to retain the still-elastic pipe in its bent form. Together with this apparatus, the pipe is placed in a hot air oven to bring it to a plasticizing temperature. Thereafter, the pipe as well as the receiving apparatus is cooled and finally the pipe is removed from the receiving apparatus. Because the pipe is still in an elastic condition at places where great deformation takes place during bending, tensions build up which are released by plasticizing and which produce a cross-sectional narrowing, thus, often, a flexible core is pulled into the pipe before it is bent to prevent this.

This process to bend plastic pipe is, because of its numerous work steps and corresponding multiplicity of operational devices, requires much space as well as time, and an undue expenditure of man-hours. Between the individual process steps the pipe must be transported to other process apparatus which, particularly for long pipe, can be very inconvenient and require a great deal of space.

It is an object of this invention to provide a process for bending plastic pipe, including various preliminary and subsequent preparation work steps, which is carried out in one apparatus and the bending of the pipe itself results independently of the skill of an operator carrying out the bending operation. Further, it is an object of this invention to provide a process for bending plastic pipe that prevents a detectable appearance of small cross-sectional differences of bent radii at bent positions.

SUMMARY

According to principles of this invention, a plastic pipe to be bent is heated to a temperature at which it can be plastically deformed; the heated pipe is shoved into a pipe-shaped channel which is defined by two grooves formed in adjacent surfaces of two separable dies of a bending tool, a length of the pipe-shaped channel corresponding to a desired length of a bend to be made and a radius thereof corresponding to a radius of the pipe; flowing a cooling agent through the pipe when it is still in the bending tool; and separating the dies of the bending tool for removing the pipe therefrom.

An apparatus to bend plastic pipe in accordance with the process of this invention comprises warming, bending and cooling stations, and has the following characteristics:

The warming, bending, and cooling stations are arranged in series along a length of a pipe to be bent;

The bending station has a bending tool which comprises two selectively separable dies having two adjacent surfaces;

A groove is formed in each of the two adjacent surfaces;

The two grooves form a pipe-shaped channel when the dies are driven together whose length has a desired bending pattern of the pipe;

A cross section of surfaces of the grooves and a cross section of the outer surface of the pipe are substantially the same;

The cooling station has a supply line with a coupling joint to couple with the pipe to the supply line for flowing a cooling medium, or agent, through the pipe.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a schematic view of the same apparatus as FIG. 1 with the dies of the bending tool together and heating fixtures being separated for a cooling step;

FIG. 3 is a cross section taken on line A—A in FIG. 2;

FIG. 4 is a cross section taken on line B—B in FIG. 2.

DESCRIPTION OF THE PREFERRED EMBODIMENT

Figure 1:
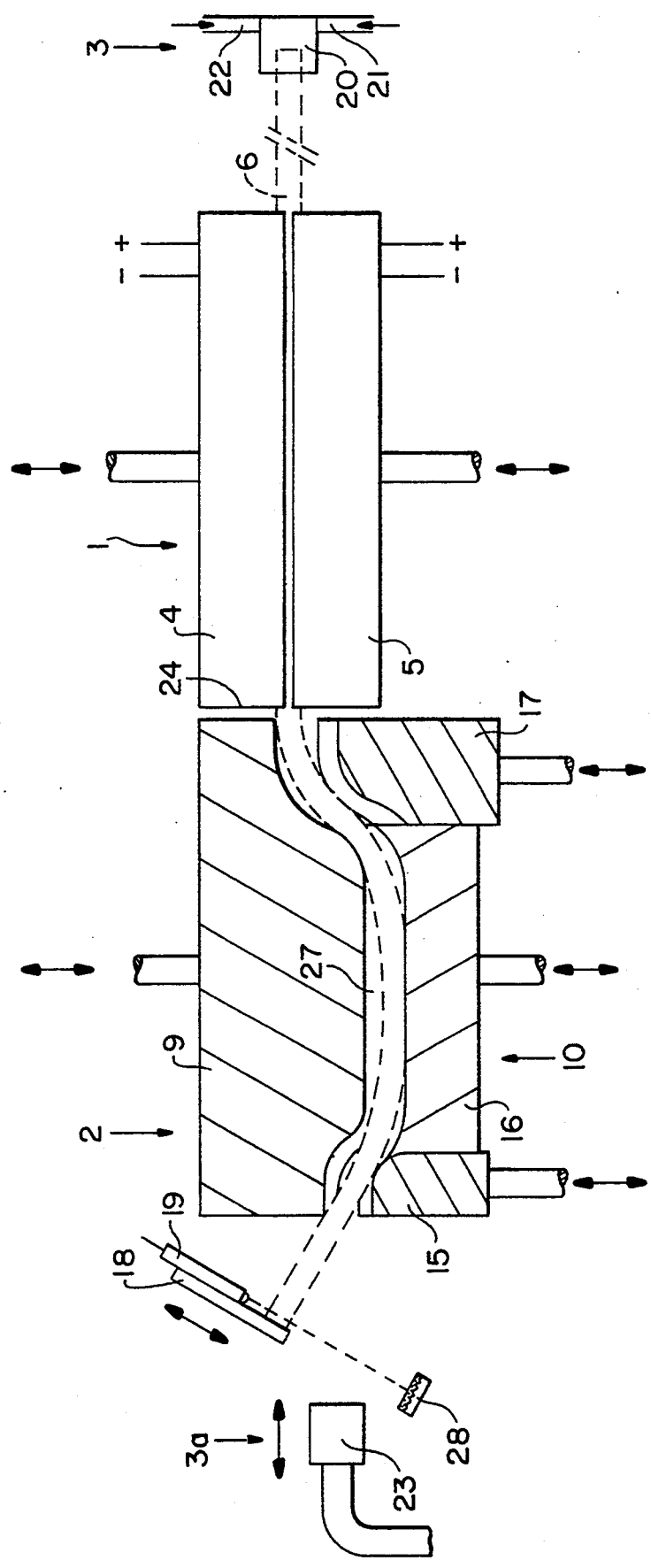
FIG. 1 is a schematic view, partly in cross section, of bending apparatus used for carrying out the process of this invention with both dies of a bending tool being separated slightly to make it easier to shove a pipe therebetween.

An apparatus to bend plastic pipe comprises a heating station 1, a bending station 2 and a cooling station 3 and 3a.

The heating station 1 comprises two electrically-heated heating fixtures 4 and 5 which can be moved separately from one another. A heating time for a plastic pipe 6 is regulated by a timing switch which is not shown. The heating fixtures 4 and 5 respectively have on their adjacent surfaces grooves 7 and 8 (FIG. 3) whose radii correspond to an outer radius of the plastic pipe 6. During a heating operation with the heating fixtures 4 and 5, which can be brought together, the fixtures are against the plastic pipe so that a direct heat conduction from the heating fixtures 4 and 5 to the plastic pipe takes place.

The bending station comprises a bending tool having two dies 9 and 10 as parts thereof. The dies 9 and 10 can be moved to be against one another. In this regard, both dies can be made to be movable or only one of them can be movable. Surfaces 11, 12 of the dies 9 and 10 which are facing one another and which can come in contact with one another when the dies are driven together and which therefore are referred to below as contact, or touching, surfaces 11 and 12, have grooves 13 and 14 formed therein which together form a pipe-shaped channel 27. This channel 27 has a length which corresponds to a bending length of the pipe. The die 10 of the bending tool is, in the depicted embodiment, divided into three parts 15, 16 and 17 which can be forced apart from one another.

A stop 18 is arranged at an end of the bending tool 9, 10 which faces away from the warming apparatus against which the plastic pipe 6 engages at its end position. A light gate 19, 28 is arranged immediately adjacent this stop which light gate is interrupted by a leading end of the pipe at its end position, and it thereby provides a pulse to activate the dies 9 and 10 of the bending tool for the purpose of driving the dies 9 and 10 or otherwise only the die 10 of the bending tool.

The cooling station substantially comprises a coupling joint 20 for a supply line 21 for a cooling medium and a supply line 22 for pressurized air as well as a coupling joint 23 for evacuation of the cooling medium as well as pressurized air.

A process for bending the plastic pipe by means of the apparatus described above involves the following process steps:

The heating fixtures 4 and 5 are driven slightly away from one another so that the plastic pipe 6 can easily be shoved between the heating fixtures 4 and 5. When this is done a front end of the plastic pipe 6, i.e., the left end as seen in the drawings, is shoved to an end 24 of the heating fixtures 4 and 5. The heating fixtures 4 and 5 are driven together so that surfaces defining the grooves 7 and 8 lie against the plastic pipe 6. After a predetermined time period, the plastic pipe 6 is thereby heated so that it is plasticized and can be plastically bent. When this plasticizing point is reached, the heating fixtures 4 and 5 are driven slightly from one another so that the pipe 6 can be easily shoved further, however, the pipe still receives guidance from the grooves 7 and 8 of the heating fixtures 4 and 5. In this position of the heating fixtures 4 and 5 the plastic pipe 6 is shoved in the pipe-shaped channel 27 which is formed by the grooves 13 and 14 in the dies 9 and 10 of the bending tool and indeed until the plastic pipe 6 is inserted in the joint 23. When this is achieved, a valve (not shown) of the joint 20 is activated and water is pumped from the supply hose 21 through the partially heated pipe 6 for cooling the pipe. When the plastic pipe is thereby cooled so that the warmed material is again hardened, the valve (not shown) is switched so that pressurized air is blown from the supply line 22 to blow any residue of water from the pipe 6. Before the cooling agent, or medium, is pumped through, the heating fixtures 4 and 5 are driven to be even further from one another as shown in FIG. 2 so that they are not cooled by the cooling of the plastic pipe 6. After the resulting cooling and drying of the pipe 6, the dies 9 and 10 as well as the coupling joints 20 and 23 are moved away so that the bent pipe can be easily removed from the bending tool.

If large-diameter plastic pipe, or plastic pipe with thicker walls, is to be bent, a bending tool is used in which the dies 9 and 10, before a plastic pipe is shoved into the bending station, are moved apart from one another so that, in comparison to an outer diameter of the plastic pipe, an enlarged channel 27 is created as is shown in FIG. 1. This enlarged channel 27 does not give the plastic pipe 6 its final form when the plastic pipe is shoved therein, i.e., the plastic pipe is not yet fully bent when it is shoved into the bending tool to have final bends with small radii. Thus, shoving the plastic pipe into the bending form is substantially easier to accomplish. The plastic pipe 6 is thereby shoved until it strikes the stop 18. In this position of the plastic pipe 6 the die 10 is moved to the die 9. The plastic pipe 6 is thereby bent to achieve its final bent form.

For plastic pipes which are still harder to deform because of their diameters or their material strengths, the die 10 of the bending tool is divided into parts 15, 16, 17. After the plastic pipe 6 is shoved into an enlarged diameter channel 27, as compared to that of the plastic pipe, of the bending tool, the portion 16 is first driven against the die 9 so that the plastic pipe 6 is strongly clamped in the bending tool by this portion 16. Finally, the portions 15 and 17 of the die 10 are driven to the die 9. Thereby the plastic pipe 6 receives its final bent form.

First and second side plates 26, 29 of sheet metal strips are attached on the die 9 of the bending tool. These first and second side plates 26, 29 extend longitudinally along edges of the touching surfaces 11 of the die 9 and extend beyond opposite touching surfaces 12 of the die 10. They prevent the plastic pipe 6 from exiting the channel 27 when it is shoved thereinto with the dies 9 and 10 separated.

When the pipe is plasticized it can be shoved into the pipe channel of the bending tool relatively easily. This shoving can be made even easier if an outer surface of the pipe is first provided with a sliding (anti-friction) agent. Pumping a cooling agent through the bent plasticized pipe produces a quick cooling of the pipe which is still in the bent form.

It is beneficial that a pipe to be bent is only heated at a portion thereof which is to be shoved into the bending tool. In this manner, the heating apparatus can be kept small on the one hand, while on the other hand, an end portion of the pipe remains stiff to aid in shoving the pipe in the bending tool.

Further, it is beneficial that the pipe is heated by means of electrical heating fixtures because such heating apparatus can be easily regulated. In this regard, a desired plasticizing of the heated pipe is determined by measuring a heating time period when taking into consideration a heating temperature.

To shove the heated pipe into the bending tool the channel of the bending tool is enlarged by separating the bending dies a small distance from one another and, after successfully shoving the pipe in the channel until it engages an end "Stop" driving the dies together. By doing this it is decidedly easier to shove the pipe in. When the pipe is fully shoved into the bending tool a sensor is activated and the two dies of the bending tool close together in response thereto.

As a cooling medium, or agent, a liquid, preferably water, is pumped through the bent pipe which is still in the bending tool. In order to thereafter dry the pipe of the liquid medium, pressurized air is blown through the pipe. This takes place through the same coupling joint to the pipe by way of a switched valve.

In order to prevent the plasticized pipe from bowing outwardly when it is shoved into the bending tool, the heated pipe is guided by the heating fixtures which are arranged immediately adjacent to the bending tool. To make the shoving even easier, the heating fixtures are moved to be separate when the pipe is shoved into the bending tool.

With an apparatus of this invention, the entire bending operation can take place with it only being necessary to transport the pipe a short distance along its length. Because the pipe is first brought to a plasticizing temperature and is gripped on all sides thereof during the bending operation, none, or insubstantial, cross-sectional changes of the pipe occur at the bending positions.

For thick-walled pipes, or pipes with large diameters, the pipe-shaped channel is enlarged by separating the two dies of the bending tool to make it easier to shove the pipe thereinto. In this regard, it is beneficial that at least one of the two dies of the bending tool along the length of its groove is divided into a plurality of parts whereby each part can be shoved independently of the other parts. In this manner compressions along the length of the pipe when the two dies are driven together are prevented.

The heating station comprises two separable electrically heated fixtures, in which grooves are formed which together complete a pipe-shaped channel having a length of a pipe portion that is to be shoved into the bending tool and whose cross section corresponds to that of the outer surface of the pipe. In this manner heat conduction from the heating fixtures to the pipe, by means of heating elements, takes place whereby a very fast and finely regulated heating transmission is possible.

It is practical that a stop is arranged at the end of the bending tool opposite to the heating station end which the pipe contacts when it is shoved into the bending tool. In this manner, exact positions of individual bending places along the length of the pipe are guaranteed. A light gate is arranged immediately adjacent the stop which is broken by a leading end of the pipe to initiate a closing operation of the bending tool. Thus, the time between the shoving of the pipe into the bending tool to its end position and the activation of the closing operation of the bending tool, can be very small and can also be independent of reactions of human operators.

Further, it is beneficial that a coupling joint to couple a following, or rear, end of the pipe with the cooling station has an additional supply line for providing pressurized air to dry the pipe's interior. In this manner, the coupling joint to the following end of the pipe does not have to be changed for cooling and drying the pipe. So that the cooling medium and the drying medium can be exhausted, a coupling joint is arranged at the end of the bending tool opposite to the heating station for coupling with the leading end of the pipe to evacuate cooling fluid and pressurized air. In this manner, on the one hand, the cooling medium can be reused and, on the other hand, the drying medium can be evacuated in an environmentally-friendly manner.

According to a further benefit of the invention, the dies of the bending tool are ledge-shaped, or flat, with the grooves for forming the bending channel being in narrow, length-wise edges thereof. In this manner the mass, or size, of the bending tool is significantly reduced.

So that the pipe does not escape, or bulge, from the bending channel when it is shoved into the bending channel with the dies separated, side plates are arranged on one die of the bending tool along a length axis thereof which extend to parallel adjacent surfaces of the other die to cover opposite sides of the other die. These side plates are preferably formed of sheet metal strips which are attached to the one die.

In order to be able to give the pipe-shaped channel in the bending tool a pattern of a pipe to be bent in a simple manner when a ledge-shaped die is used, the adjacent touching surfaces 11,12 of the die can follow the bending path of the pipe. It is, however, also possible to give the opposite broad sides of the ledge-shaped dies the bending path of the pipe. Should the pipe be bent in two planes, a combination of both of the above described patterns of the pipe-shaped channel are possible.

While the invention has been particularly shown and described with reference to a preferred embodiment, it will be understood by those of ordinary skill in the art that various changes in form and detail may be made therein without departing from the spirit and scope of the invention.

The embodiments of the invention in which an exclusive property or privilege are claimed are defined as follows:

1. A process to bend plastic pipe in which a pipe to be bent is first heated, placed in a bending channel determining bending tool and cooled, said process comprising the steps of:

Heating the pipe by opposite heating fixtures along a portion thereof which is to be shoved into the bending tool to a temperature at which it can be plastically deformed;

Shoving the heated pipe lengthwise, while it is guided by the opposite heating fixtures, into the pipe-shaped bending channel formed of two grooves in adjacent surfaces of two separable dies of the bending tool, a length of the pipe-shaped channel substantially corresponding to a length of pipe to be bent and a cross-sectional radius of each of the grooves thereof substantially corresponding to a radius of the pipe, whereby the plastically deformable pipe is bent by the grooves of the separable dies;

Cooling the pipe while it is still in the bending tool; and

Separating the dies of the bending tool and removing the pipe therefrom.

2. A process as in claim 1 wherein the heating fixtures which carry out the step of heating the pipe are electrically heated heating fixtures.

3. A process as in claim 1 wherein is further included the step of enlarging the bending channel before the heated pipe is shoved thereinto by slightly separating the dies and wherein is further included the step of thereafter driving the dies together.

4. A process as in claim 1 wherein the cooling of the pipe step is accomplished by flowing a cooling medium through the pipe.

5. A process as in claim 4 wherein the cooling medium pumped through the bent pipe is a liquid.

6. A process as in claim 5 wherein is further included the step of drying the pipe interior through which the cooling liquid has been flowed by flowing a gas therethrough.

7. A process as in claim 1 wherein is further included the step of separating the heating fixtures slightly when the pipe is shoved into the bending tool.

8. A process to bend plastic pipe in which a pipe to be bent is first heated, placed in a bending channel determining bending tool and cooled, said process comprising the steps of:

Heating the pipe by opposite heating fixtures along a portion thereof which is to be shoved into the bending tool to a temperature at which it can be plastically deformed;

Shoving the heated pipe lengthwise into the pipe-shaped bending channel formed of two grooves in adjacent surfaces of two separable dies of the bending tool, a length of the pipe-shaped channel substantially corresponding to a length of pipe to be bent and a cross-sectional radius of each of the grooves thereof substantially corresponding to a radius of the pipe, whereby the plastically deformable pipe is bent by the grooves of the separable dies, the separable dies being separated during this step to enlarge the pipe-shaped bending channel;

Driving the dies together to make the pipe-shaped channel smaller and thereby finally shape the heated pipe;

Cooling the pipe while it is still in the bending tool; and

Separating the dies of the bending tool and removing the pipe therefrom.

9. A process as in claim 8 wherein the heating fixtures which carry out the step of heating the pipe are electrically heated heating fixtures.

10. A process as in claim 8 wherein the cooling of the pipe step is accomplished by flowing a cooling medium through the pipe.

11. A process as in claim 10 wherein the cooling medium pumped through the bent pipe is a liquid.

12. A process as in claim 11 wherein is further included the step of drying the pipe interior through which the cooling liquid has been flowed by flowing a gas therethrough.

13. A process as in claim 8 wherein is further included the step of separating the heating fixtures slightly when the pipe is shoved into the bending tool.

* * * * *